United States Patent [19]
Nakai et al.

[11] Patent Number: 5,574,243
[45] Date of Patent: Nov. 12, 1996

[54] MELODY CONTROLLING APPARATUS FOR MUSIC ACCOMPANIMENT PLAYING SYSTEM THE MUSIC ACCOMPANIMENT PLAYING SYSTEM AND MELODY CONTROLLING METHOD FOR CONTROLLING AND CHANGING THE TONALITY OF THE MELODY USING THE MIDI STANDARD

[75] Inventors: Toshiki Nakai; Mitsuyoshi Amano; Kazuhiro Miyamoto; Yoshiyuki Akiba; Masuhiro Sato, all of Tokyo-to, Japan

[73] Assignee: Pioneer Electronic Corporation, Tokyo-to, Japan

[21] Appl. No.: 305,931

[22] Filed: Sep. 19, 1994

[30] Foreign Application Priority Data

Sep. 21, 1993 [JP] Japan ................................. 5-234643

[51] Int. Cl.$^6$ ............................... G09B 5/00; G10H 3/03; G10H 3/06; H04N 5/76
[52] U.S. Cl. ................ 84/609; 84/611; 84/613; 84/639; 84/645; 434/307 A; 386/97
[58] Field of Search ................... 84/609–614, 477 R, 84/478, 639, 640, 645; 358/335, 341–3; 434/307 A

[56] References Cited

U.S. PATENT DOCUMENTS

| | | | |
|---|---|---|---|
| 4,881,440 | 11/1989 | Kakizaki | 84/609 |
| 5,200,566 | 4/1993 | Shimaya | 84/609 |
| 5,233,438 | 8/1993 | Funahashi et al. | 358/335 X |
| 5,245,600 | 9/1993 | Yamauchi et al. | 358/343 X |
| 5,247,126 | 9/1993 | Okamura et al. | 84/609 |
| 5,281,754 | 1/1994 | Farrett et al. | 84/609 |
| 5,340,939 | 8/1994 | Kumagai | 84/609 |
| 5,350,880 | 9/1994 | Sato | 84/609 |
| 5,436,403 | 7/1995 | Usa | 84/609 |

Primary Examiner—Stanley J. Witkowski
Attorney, Agent, or Firm—Young & Thompson

[57] ABSTRACT

A melody controlling apparatus is provided with: a reproducing device for reproducing first digital sound source controlling information and melody controlling information related to the first digital sound source controlling information; a memory for storing melody changing information; a melody changing device for reading the melody changing information from the memory according to the melody controlling information reproduced by the reproducing device, and changing the first digital sound source controlling information on the basis of the melody changing information to generate second digital sound source controlling information; and a digital sound source for generating music information signal from the second digital sound source controlling information.

14 Claims, 12 Drawing Sheets

FIG. 3

TRACK TYPE AND KEY UNCHANGED TRACK

| Track Type | Code | Key Unchanged Track (○ MARK) |
|---|---|---|
| CONDUCTOR TRACK | :11h | |
| Ex DATA TRACK | :10h | |
| ORDINARY NOTE TRACK | :00h | |
| RHYTHM TRACK (KEY-CONTROL UNCHANGED) | :01h | ○ |
| KEY-CONTROL UNCHANGED TRACK | :02h | ○ |
| MELODY TRACK | :03h | |
| BASS TRACK | :04h | |
| BACKING PART TRACK | :05h | |
| AT CHANGING MELODY, NON-MUTE TRACK | :07h | |
| CHORD TRACK | :08h | |
| PROGRAM CHANGE TRACK | :09h | |
| VOCAL EFFECT TRACK | :0Ah | |
| DRUM BASS OUTPUT TRACK | :21h | ○ |
| BASE BASS OUTPUT TRACK | :24h | |

| BYTE | DATA | |
|---|---|---|
| 1 | Status Byte | Track Header |
| 2~5 | Track Length | |
| 6 | Status Byte | |
| 7 | Track Type | |
| 8~n | Conductor Data | |
| n+1~n+2 | Track End Data | |

FIG. 13 A

| BYTE | DATA |
|---|---|
| 1 | Status Byte |
| 2~5 | Track Length |
| 6 | Status Byte |
| 7 | Track Type |
| 8 | Status Byte |
| 9 | Channel |
| 10~n | Data |
| n+1~n+2 | Track End Data |

Bytes 1–9: Track Header

FIG. 13 B

TRACK HEADER DATA:
```
STATUS=FFh
Track Length=4byte
Track Type
    CHORD TRACK          =08h
    PROGRAM CHANGE TRACK =09h
    VOCAL EFFECT TRACK   =0Ah
Channel
    STATUS=F0h
    DATA  =[Channel]:1byte DATA
    EACH TRACK TREATED IN THE SAME
    MANNER AS THE NOTE TRACK
       (MIDI DATA)
```

5,574,243

MELODY CONTROLLING APPARATUS FOR MUSIC ACCOMPANIMENT PLAYING SYSTEM THE MUSIC ACCOMPANIMENT PLAYING SYSTEM AND MELODY CONTROLLING METHOD FOR CONTROLLING AND CHANGING THE TONALITY OF THE MELODY USING THE MIDI STANDARD

BACKGROUND OF THE INVENTION

1. Field of the Invention

The present invention generally relates to a music accompaniment playing (so-called "karaoke") system, and more particularly to a melody controlling apparatus for and a melody controlling method of performing a melody change in information to control a digital sound source such as a MIDI (Musical Instrument Digital Interface) apparatus. Here, the "melody" means the tonality (e.g. C major, A minor) of the music program, and the constructions of the rhythm and the chord (harmony) applied to the music program. The "melody change" means the change in the tonality which is owned by the original music program, or the change (arrangement) in the construction of the rhythm and the chord and so on.

2. Description of the Related Art

In a music accompaniment playing system, the composition of the music information which is the base of the accompaniment, is performed by use of a tonality (e.g. C major, A minor) suitable for the music field (genre) of the original music program. The arrangement thereof is performed by use of the rhythm and the chord etc. suitable for the music program at the time of composing the accompaniment music, so that the thus performed music is prepared as the accompaniment music information.

As a melody controlling apparatus for the music accompaniment playing system etc., there is an apparatus which has a plurality of accompaniment music information each corresponding to one of various music genres, and which selects and calls the accompaniment music information in accordance with the music genre requested by the user, and which performed the thus selected accompaniment music information, as disclosed in Japanese Patent Application Laid Open Hei No. 03-290,696.

As another type of melody controlling apparatus for changing the information of the original music program upon giving the actual performance, there is a key controller etc., which changes the key of the whole performance in accordance with the change in the key (sound key) of the sound voice of the user who is singing a song by the music accompaniment playing system.

However, the change in the accompaniment music information in the above mentioned performance controlling apparatuses, is limited in the range of the performance genre change which mainly consists of the change in the selection of the rhythm or the tempo. Otherwise, the change in the tonality is not performed by the above mentioned performance controlling apparatuses. Namely, such a bold arrangement of the music program over the whole music composition is not performed, by applying the change in the music construction including the characteristic sounds etc., which are composed of root sound of the music program as the base, according to the above mentioned performance controlling apparatuses.

Further, the feature of having a plurality of performance information with respect to a single music program, is contrary to the practical demand to input, into the limited amount of the memory device provided in the music accompaniment playing system, as many music programs as possible.

Furthermore, the key controlling function is provided to support singing, and to control the sound key of the whole music information to be performed. Thus, it is not the function for pleasure, to allow the listeners to listen to the music program as if it were the different music program by positively changing or arranging the music program.

SUMMARY OF THE INVENTION

It is therefore an object of the present invention to provide a melody controlling apparatus for a music accompaniment playing system, the music accompaniment playing system and a melody controlling method in the music accompaniment playing system, which can freely change the melody, such as the tonality, the rhythm, the tempo, the chord etc., and the arrangement of the original music program, without the necessity of storing a plurality of music information with respect to a single music program in advance.

The above object of the present invention can be achieved by a melody controlling apparatus provided with: a reproducing device for reproducing first digital sound source controlling information and melody controlling information related to the first digital sound source controlling information; a memory for storing melody changing information; a melody changing device for reading the melody changing information from the memory according to the melody controlling information reproduced by the reproducing device, and changing the first digital sound source controlling information on the basis of the melody changing information to generate second digital sound source controlling information; and a digital sound source for generating music information signal from the second digital sound source controlling information.

According to the melody controlling apparatus of the present invention, the first digital sound source controlling information and the melody controlling information are reproduced by the reproducing device, while the melody changing information is stored in the memory. Here, the melody changing device reads the melody changing information from the memory according to the melody controlling information, and changes the first digital sound source controlling information on the basis of the melody changing information. Thus, by supplying the second digital sound source controlling information to the digital sound source, the melody such as the tonality, the rhythm, the chord, the tempo etc., can be changed in the music information signal. In this manner, the melody can be freely changed without storing a plurality of music information with respect to a single music program in advance, according to the melody controlling apparatus of the present invention.

The above object of the present invention can be also achieved by a music accompaniment playing system provided with: a first reproducing device for reproducing first digital sound source controlling information, melody controlling information related to the first digital sound source controlling information, and lyrics information corresponding to the first digital sound source controlling information; a memory for storing melody changing information; a melody changing device for reading the melody changing information from the memory according to the melody controlling information reproduced by the first reproducing device, and changing the first digital sound source controlling information on the basis of the melody changing information to generate second digital sound source controlling information; a digital sound source for generating music information signal from the second digital sound source controlling information; a second reproducing device for reproducing video information; and a superimposing device for superimposing the lyrics data reproduced by the first reproducing device on the video information reproduced by the second reproducing device.

Thus, the above mentioned advantageous effect of the melody controlling apparatus of the present invention can be achieved by the music accompaniment playing system of the present invention, in the same manner.

The above object of the present invention can be also achieved by a melody controlling method including the steps of: specifying a music title and a melody change by an operation unit; reproducing first digital sound source controlling information and melody controlling information related to the first digital sound source controlling information, according to the specified music title, by a reproducing device; changing the first digital sound source controlling information on the basis of the specified melody change according to the melody controlling information, to generate second digital sound source controlling information; and generating music information signal from the second digital sound source controlling information, by a digital sound source.

According to the melody controlling method of the present invention, by specifying a melody change such as a chord change, a rhythm change, a style change etc, by use of the operation unit, the above mentioned advantageous effect of the melody controlling apparatus of the present invention can be achieved in the same manner.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram for explaining track types and key unchangeable tracks in the first embodiment;

FIGS. 13A and 13B are diagrams showing a specification of a chord track, a program change track, a vocal effect track of the MIDI music accompaniment playing file of FIG. 11.

DETAILED DESCRIPTION OF THE PREFERRED EMBODIMENTS

Referring to the accompanying drawings, embodiments of the present invention will be now explained.

Prior to the explanation of concrete embodiments of the present invention, the MIDI standard, which is the representative digital sound source controlling information for the present embodiments, the MIDI sound source and the MIDI music accompaniment playing file based on the MIDI standard, which are used in the present embodiments, will be explained here.

MIDI Standard and MIDI Sound Source

The MIDI standard is prescribed as a music information transmission means for connecting instruments such as a synthesizer, an electric piano etc., mainly for a live performance.

An electric instrument etc., which has a function to receive and transmit mutually a MIDI controlling signal, which is a music performance controlling signal defined to carry various music information based on the MIDI standard, is called a MIDI apparatus.

A transmission format of the MIDI standard is such that the data transmission is performed by a non-synchronized type serial transmission with a transmission rate of 31.25 [K baud (=1000 bps)], and that one data is constructed by total 10 bits made up of 8 data bits, 1 status bit and 1 stop bit.

As the data format, 1 status byte and 1 or 2 of the data bytes are combined. The status byte is prepared to specify the data type and MIDI channel of the data to be transmitted. The data bytes are composed of the music information guided by this status byte, and forms one message on the whole. The MIDI channel is such a channel that the sound tone of one instrument may be assigned to one channel.

Therefore, one message consists of one to three bytes, and the transmission thereof requires a transmission time of 320 to 960 [μsec]. The performance of the instruments is performed by transmitting one series of the message to the MIDI instruments.

Figure 8:
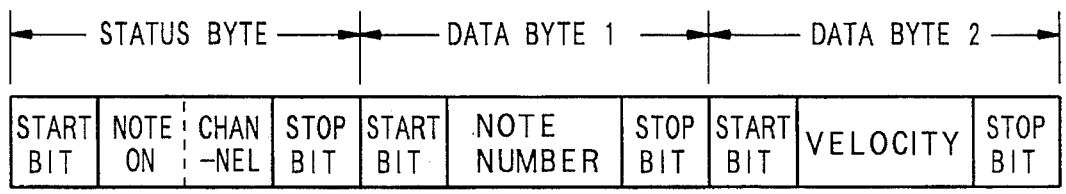
FIG. 8 is a diagram showing an example of a data format based on the MIDI standard.

As one example of such a message, a construction of a note on message which is one of a channel voice message is shown in FIG. 8.

In FIG. 8, the note on message of the status byte is, for example, an instruction corresponding to the operation to push the keyboard, and is used in a pair with a note off message corresponding to the operation to release the keyboard. This feature is shown in FIG. 9.

Figure 9:
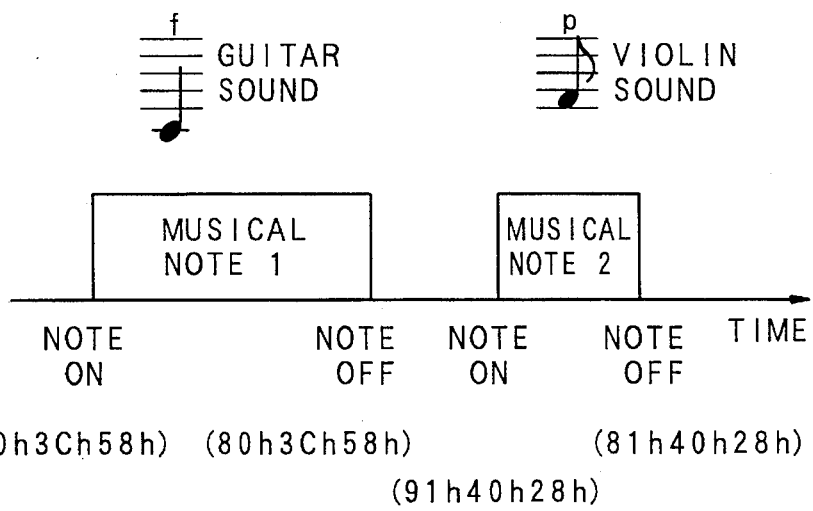
FIG. 9 is a diagram showing an example of a musical tone by MIDI data.

In FIG. 9, 90h (h: hexadecimal (16) digits) etc., is used for the note on message, and 80h etc., is used for the note off message.

In FIG. 8 again, the channel can correspond to 16 different instruments, and 0h to Fh are used for it. The note number of the data byte 1 specifies one of the 128 levels assigned to the keyboard (0h to 7Fh), with a "center C" of the 88 keys piano being located at the center. The velocity of the data byte 2, is used to differentiate the sound volume level and the strength of the sound, and specifies one of the 128 levels (0h to 7Fh). The MIDI apparatus which has received the note on message, generates the sound of the specified key by the specified strength. For example, it generates the same sound as the key of the keyboard is actually pressed. By receiving the note off message, the MIDI apparatus performs the same operation as the operation of releasing the key of the keyboard, for example. By this, each of the sound note 1 and the sound note 2 in FIG. 9, can generate a sound with a sound scale, a sound strength and a sound length different from each other. Further, just by changing the channel of the sound source, the transmissions of the sounds for different instruments can be performed.

In FIG. 9, the MIDI data are transmitted to the instrument which has the sound tone of a guitar at the channel 0, and to the instrument which has the sound tone of a violin at the channel 1, and the corresponding sounds are generated. The sound note 1 can be obtained by transmitting the note on message with the C sound scale, the forte strength and the quarter note length onto the channel 0, and then by erasing the same sound by the note off message at the guitar. The sound tone 2 can be obtained by transmitting the message in the same manner as the sound tone 1 for the channel 1, with the F sound scale, the 28h strength and the eight note length at the violin.

Figure 10:
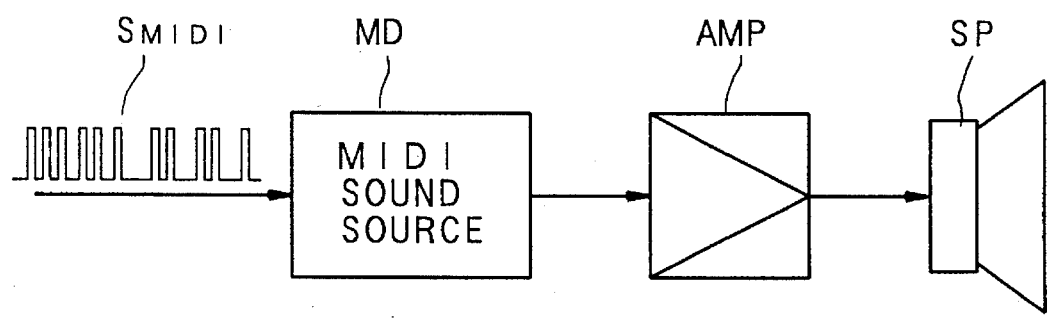
FIG. 10 is a block diagram of a MIDI sound source.

Therefore, as shown in FIG. 10, a desired music sound can be generated by transmitting the MIDI data $S_{MIDI}$ appropriately, by use of a MIDI sound source module MD, an amplifier AMP, and a speaker SP, in place of an electric instrument.

MIDI Music Accompaniment Playing File Based on the MIDI Standard

By use of the MIDI standard as described above, the information prescribed to control the music accompaniment playing system, is stored in the MIDI information memory device, which is the MIDI music accompaniment playing file based on the MIDI standard. The note file which is the pure MIDI data required for the present invention and the melody controlling information are all included in the MIDI music accompaniment playing file.

The construction of the MIDI music accompaniment playing file is explained here with referring to FIG. 11.

Figure 11A:
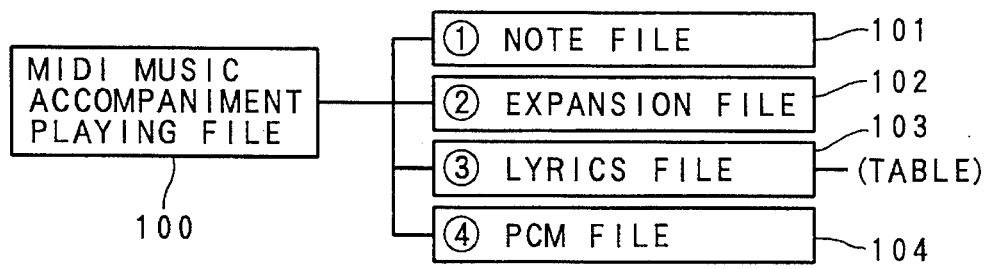
FIGS. 11A and 11B are diagrams showing a construction of a MIDI music accompaniment playing file.

In FIG. 11A, the roughly categorized structure of the whole MIDI music accompaniment playing file, is shown. In FIG. 11A, a MIDI music accompaniment playing file 100 is categorized into a note file 101, an expansion file 102, a lyrics file 103 and a PCM (Pulse Code Modulation) file 104. The note file 101 includes the music information for controlling the MIDI sound source. The expansion file 102 is changed in correspondence with the usage of the extension, and then used. The lyrics file 103 includes table data used for searching the music programs etc., lyrics data which are the data directly representing lyrics, and timing map to change the color of the lyrics according to the performance. The PCM file 104 contains the PCM data to transmit the effective sounds etc., other than the music data by use of the PCM decoder etc.

Figure 11B:
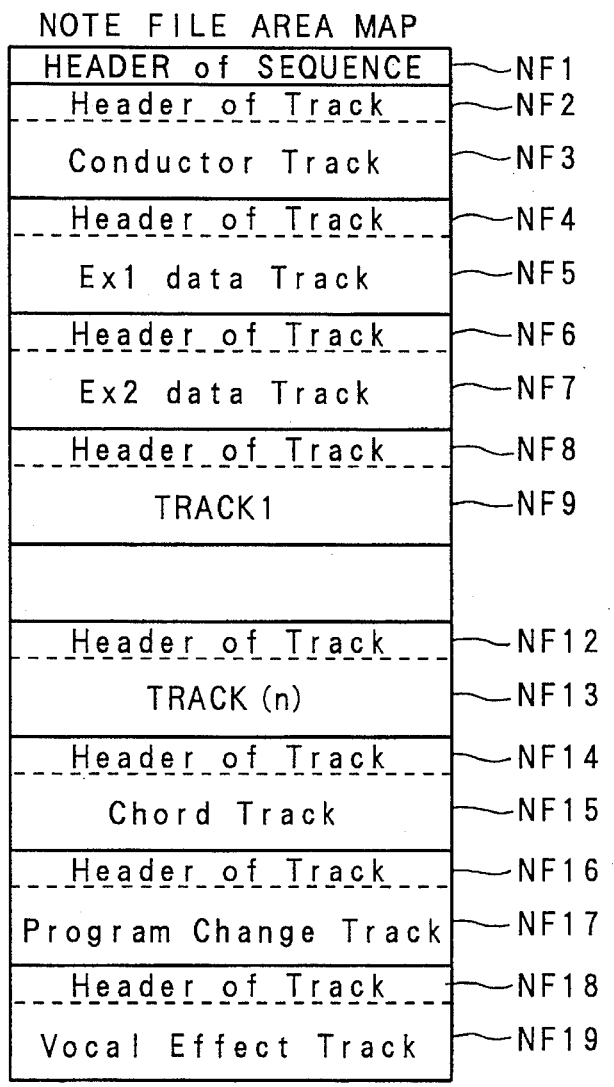

The note file as the main portion of the music information is explained nextly with referring to FIG. 11B.

In FIG. 11B, the note file NF (Note File) is a file to which the actual performance data is stored, and includes a plurality of data areas NF1 to NF19. Among those areas, the data area NF3 for a conductor track stores the data to set the tonality of the rhythm, tempo and melody controlling information. The data area NF5 for an Ex data track stores the additional information. The dada areas NF8 to NF13 are called note tracks, where up to 16 tracks can be used, and store data which are the main data for the MIDI sound source performance. The data area NF 15 for a chord track is used for a track expressing a chord progress of the music program. The data area NF 17 is used for a program change track for storing the melody controlling information such as a style and a pattern used in changing the melody. The data area NF 19 is used for a vocal effect track for the vocal effect.

The present invention is related with the conductor track of the data area NF3, the chord tack of the data area NF15, and the program change track of the data area NF17 among those tracks.

Figure 12:
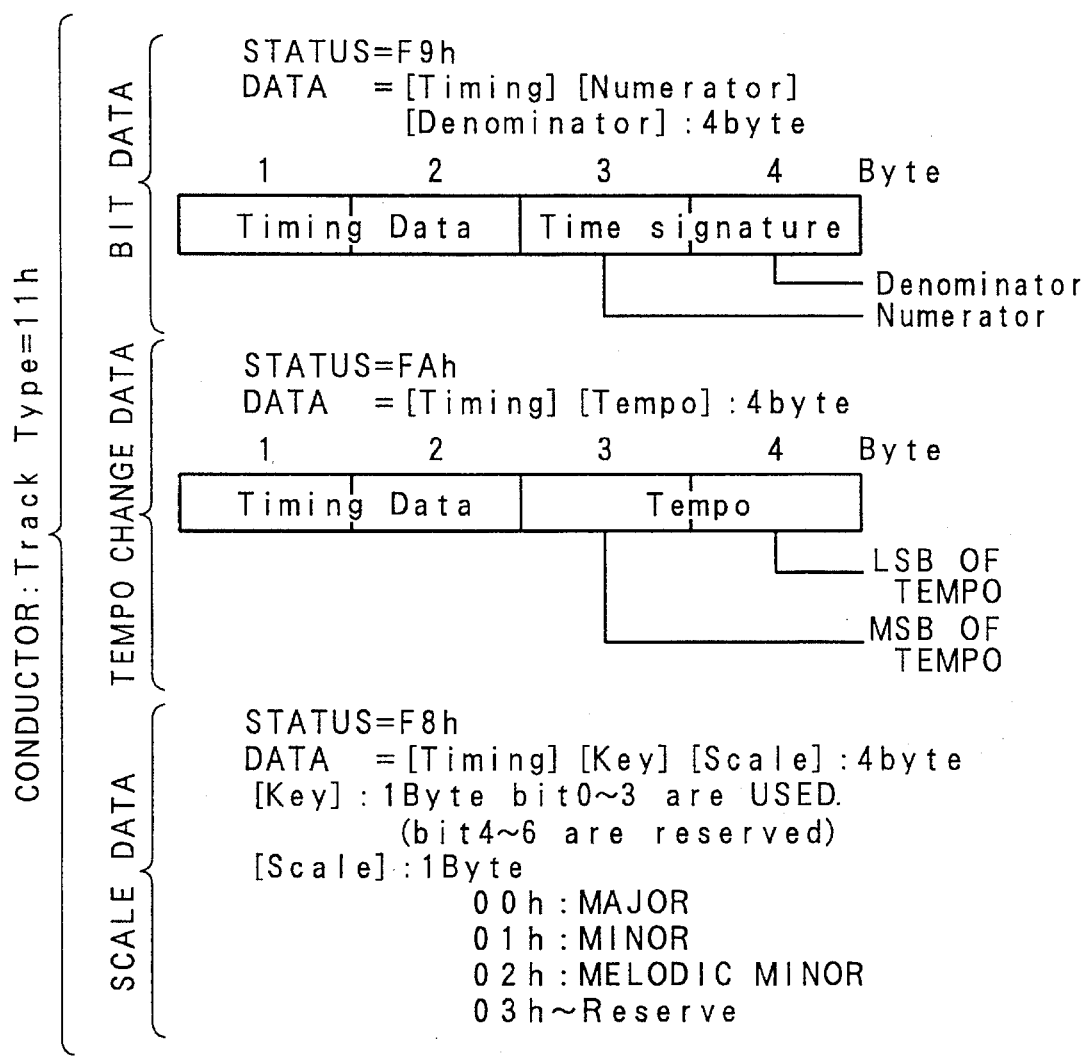
FIGS. 12A and 12B are diagrams showing a construction of a conductor track of the MIDI music accompaniment playing file of FIG. 11.

With referring to FIG. 12, the detailed file construction of the conductor track is shown. FIG. 12A is a construction of the track. As shown in FIG. 12A, the track type of the conductor track is 11h, and by the value of the status byte, the type of the data can be recognized.

FIG. 12B shows the conductor data dealt by this track. As shown in FIG. 12B, the conductor track has bit data (status= F9h), tempo change data (status=FAh), and scale data (status=F8h), as the basic data. The conductor track also has omnibus data (status=81h), two chorus fade out data (status= 83h, 84h) as data for extraordinary performances. To each data, the value of the status is exclusively assigned, and the main portions of the data are different form data to data in different types. In the present embodiment, the bytes for [Key] and [Scale] are necessary within the scale data.

On the basis of FIG. 13, the chord track, the program change track and the vocal effect track are explained. FIG. 13A shows the basic construction of those tracks. The main portion of the data has the same structure of the note track which is the MIDI data itself. FIG. 13B shows this data construction. In the same manner as the conductor track, the track types are determined respectively. In the present embodiment, the data related to the chord and the style to be stored in the data portion, are necessary.

The concrete preferred embodiments of the present invention will be explained hereinafter with referring to FIG. 1 to FIG. 7.

First Embodiment

Figure 1:
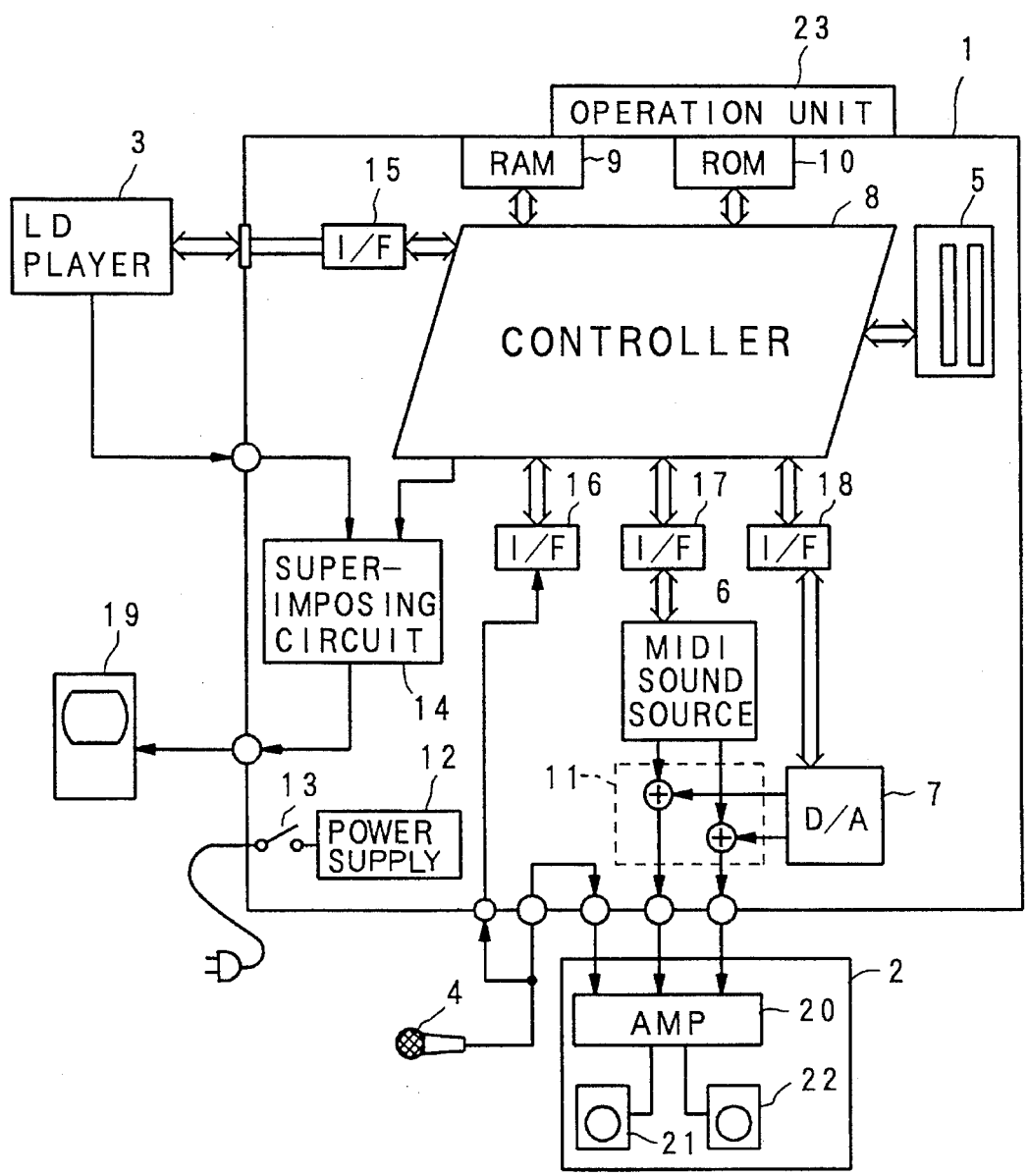
FIG. 1 is a block diagram of a music accompaniment playing system as a first embodiment of the present invention.

The construction of a music accompaniment playing system including a melody controlling apparatus as a first embodiment of the present invention, is shown in FIG. 1.

In FIG. 1, the music accompaniment playing system of the first embodiment is provided with: a MIDI controlling apparatus 1 and a sound output system 2; a laser disc (LD) player 3; a microphone 4; and a monitor 19.

The MIDI controlling apparatus 1 is provided with: an OMDD (Optical Memory Disc Drive) 5, which stores the MIDI information; a MIDI sound source module 6; a D/A (Digital to Analog) convertor 7 which is an example of the PCM decoder; a controller 8; a RAM (Random Access Memory) 9 for temporarily storing the MIDI data etc.; a ROM (Read Only Memory) 10 for storing the tonality changing data; a mixer 11; an electric power supply 12; a power supply switch 13; a superimposing circuit 14; interfaces 15 to 18; and an operation unit 23.

The mixer 11 mixes the output of the MIDI sound source module 6 and the output of the D/A convertor 7.

The sound output system 2 is provided with: an amplifier 20 and speakers 21 and 22.

Nextly, the basic operation of the music accompaniment playing system of the first embodiment is explained.

(a) Firstly, table data in the table file for the MIDI music accompaniment playing data are read by the OMDD 5, and are stored into the RAM 9. The user performs searching, with reference to a table not shown, by use of the operation unit 23, and requests a desired music program.

(b) The controller 8 calls the MIDI music accompaniment playing file of the corresponding music program, from the OMDD 5, and stores it into the RAM 9.

(c) The corresponding background video image which is specified in the table data, is transmitted to the laser disc player 3, and the command is searched to reproduce it. When the video image is displayed on the monitor 19, the performance is started.

(d) The controller 8 reads the note file data from the RAM 9, and transmits it to the MIDI sound source module 6. The accompaniment music information for music accompaniment playing, is transmitted to the mixer 11 from the MIDI sound source module 6.

(e) As synchronized with it, the PCM file data is called from the OMDD 5, is formed into the sound voice signal by the D/A convertor 7, and is applied to the mixer 11.

(f) The sound mixed by the mixer 1, is transmitted to the amplifier 20, and the sounds are generated by the speakers 21 and 22.

(g) At this time, the amplifier 20 mixes the sound voice signal form the microphone 4 with the sound voice signal supplied from the mixer 11, and transmits it to the speakers 21 and 22.

(h) On the other hand, the other output for sound key control from the microphone 4 is supplied to the controller 8, and is used for sound key control.

(i) The controller 8 reads the lyrics file data in synchronization with the outputs of the MIDI signal related to the sound voice and the PCM signal, converts it to the character signal, and transmits it to the superimposing circuit 14. The superimposing circuit 14 superimposes the character signal on the video image signal transmitted from the laser disc player 3 etc., and transmits it to the monitor 19.

(j) The user sings by use of the microphone 4 as he is watching the lyrics on the picture plane of the monitor 19.

Figure 2:
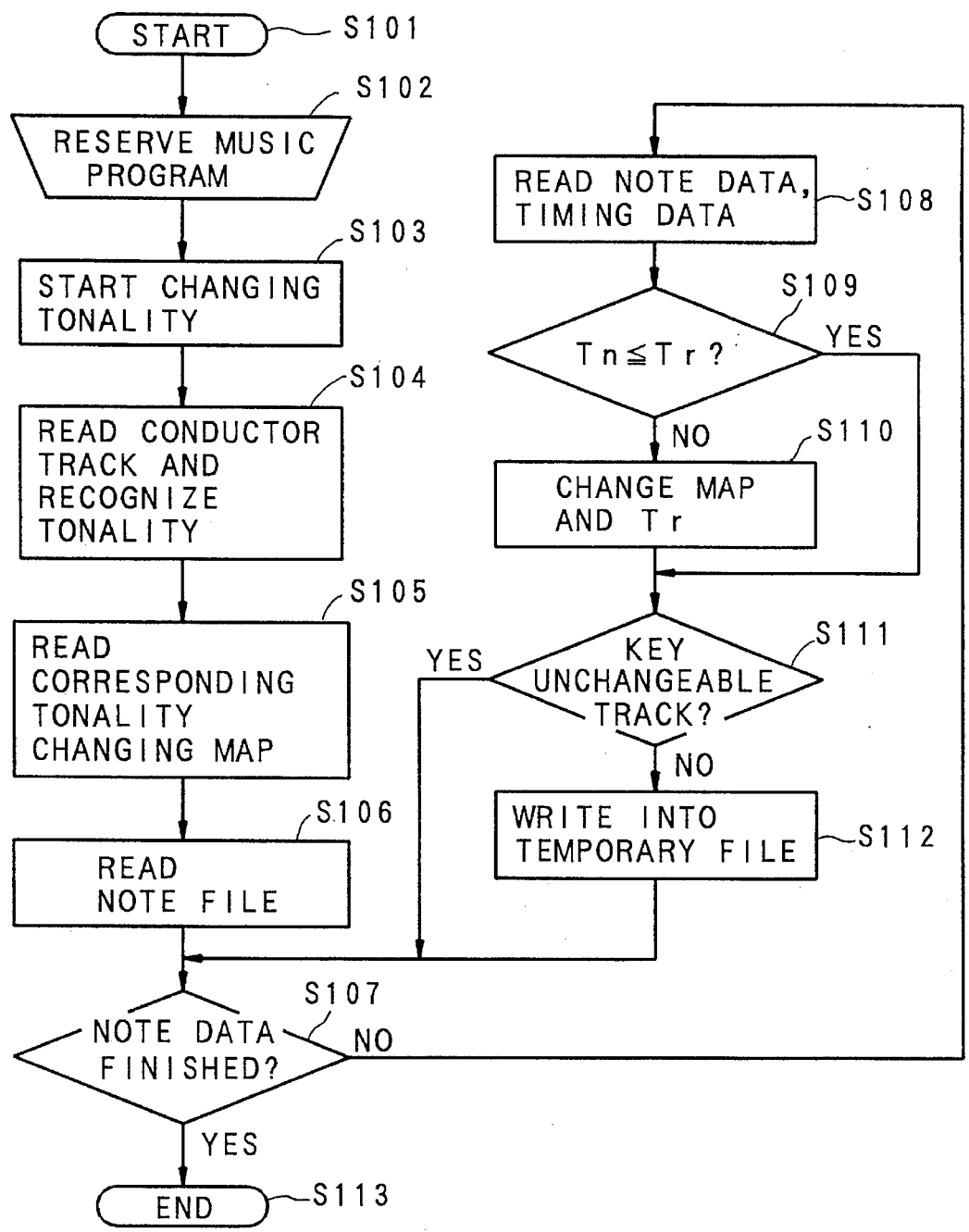
FIG. 2 is a flowchart of a tonality changing operation of the first embodiment.
Figure 4:
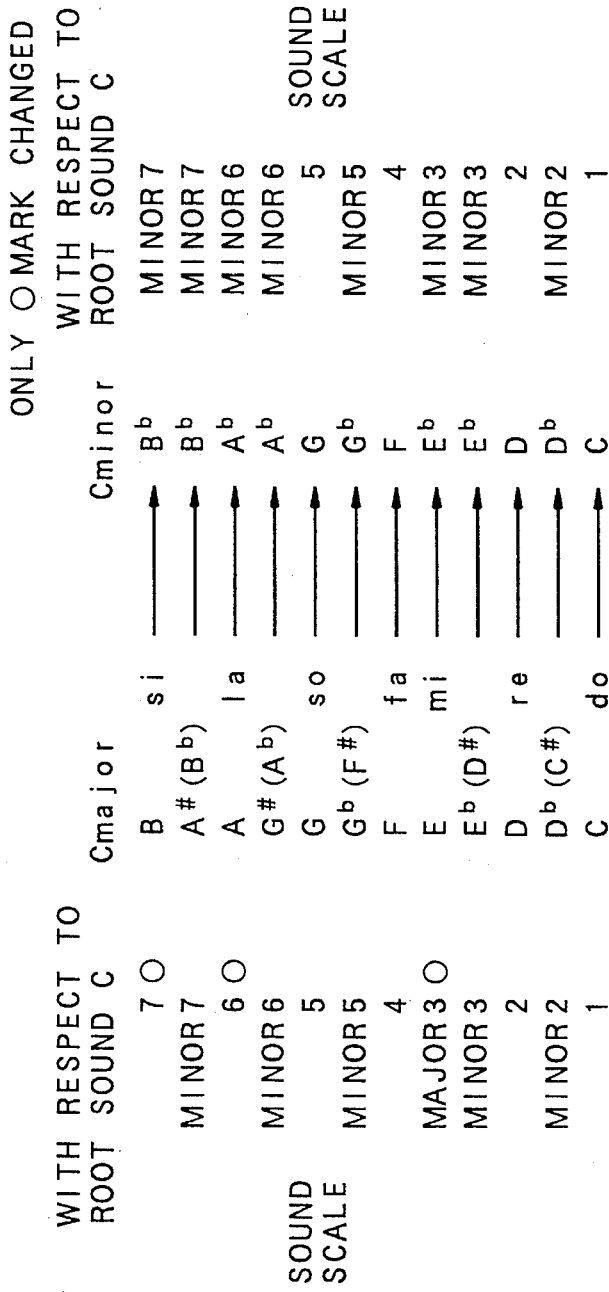
FIG. 4 is a diagram showing an example of a tonality changing map used in the first embodiment.

Nextly, the operation of the first embodiment is explained with referring to FIG. 2 to FIG. 4.

The present embodiment is such an embodiment that the atmosphere of the music program is changed by changing the tonality of the original music program to a different tonality of the sound scale.

Firstly, the operation starts from an operation preparation condition (step S101). The user specifies a music program, which he desires to sing, to the controller 8 via the operation unit 23 to reserve it, with referring to a table or list in a booklet form etc. (step S102). The controller 8 starts the tonality changing operation when the order of the specified desire music program has come (step S103).

Nextly, the controller 8 reads the conductor track of the corresponding music program form the OMDD 5, and stores it to the RAM 9. Then, the controller 8 recognizes the tonality and the measure number of the corresponding music program, with referring to the key byte and the scale byte of the scale data specified by the conductor track (there may be a plurality of the tonalities and the measure numbers within the music program) (step S104).

Then, the controller 8 reads the tonality changing map (conversion comparison table), which is necessary to perform changing the tonality at this tonality, from the ROM 10 and stores it to the RAM 9 (step S105). The preparation is completed at this stage, and the controller 8 reads the note file which is the main portion of the MIDI sound source controlling information, and stores it to the RAM 9 (Step S106).

Here, it is judged whether reading the note file is finished until the end thereof or not (step S107).

If reading the note file is judged to be finished (YES at the step S107), the tonality changing operation is ended (step S113). In case that the flow branches into the step S113 at the first turn, it is concluded that there does not originally exist the note file, so that the tonality change and the performance are not possible. However, if all of the change is finished after the procedure as described below, the tonality changing operation can be normally completed and the performance can be performed thereafter (step S113).

If reading the note file is judged to be not finished (NO at the step S107), the flow branches to a step S108, where the controller 8 reads the note data and the timing data of the note file. This timing data includes the relative time information when each MIDI data should be outputted.

Then, a performance time Tn during which the notes interrupted from this timing data is to be performed with a map changing time Tr, which is the time until the next change in the rhythm, are compared i.e. it is judged if it is Tn≦Tr or not, so that it is determined whether the map of the sound scale should be changed or not (step S109).

If it is Tn≦Tr (YES at the step S109), it is further judged whether the track of the corresponding note data is a key unchangeable type track or not (step S111).

Here, the key unchangeable type track is explained with referring to FIG. 3. As shown in FIG. 3, a rhythm track 01h for rhythmic instruments, a key control unchangeable track 02h, which does not require any key control, and a drum bass output track 21h, are the parts where no sound scale exists, so that there is no necessity to change the tonality. Thus, even if the key change for the whole music program is specified, the key change is not performed with respect to those tracks.

In FIG. 2 again, if it is one of those key unchangeable type tracks (YES at the step S111), the operation is proceeded to another note data (step S107).

If it is the track to which the tonality change is to be performed (NO at the step S111), the note data is examined by referring to the corresponding tonality changing map which has been read at the step S105, and calls the note number value (sound scale) of the note to be changed if it corresponds to the note to be changed. Then, the corresponding data in the temporary file in the RAM 9, which has stored the note data at the step S106, is rewritten (step S112). After rewriting, the operation is proceeded to another note data (step S107).

If it is Tn>Tr (NO at the step S109), the map of the note after this time, is changed to the specified one, and the time interval until the next rhythm change is set as the Tr (step S110). After that, the note data is processed (step S111).

When all of the changes are finished (YES at the step S107), the tonality changing operation is ended (step S113).

By the steps described above, the data which has undergone the tonality change, is stored in the temporary file, so that the performance can be started at any time after that.

Here an example of the tonality map used in the present embodiment, is explained with referring to FIG. 4. As shown in FIG. 4, this example is directed to a map to perform the tonality change form the C major, in which C sound is the root sound, to the C minor, in which the same C sound is the root sound. In each line of the sound scale, the characteristic sound to give a characteristic to the music program is included, such that the atmosphere of the whole music program is greatly changed just by changing the characteristic sound by halftone. The music program of the major key, has generally a pleasant impression as in the case of the children's songs, while the music program of the minor key has generally a sad impression as in the case of the "enka" which is a Japanese popular love song. In the example of FIG. 4, three sounds E, A and B to each of which reference mark O is added in the figure, are changed in the map. Namely, the major 3 degree E is changed to the minor 3 degree Eb, the major 6 degree A is changed to the minor 6 degree Ab, and the major 7 degree B is changed to the minor 7 degree Bb. The reason why the tonality change is performed in the tonality change map without changing the root sound, is that, if the root sound is changed i.e. if the transposition is performed, the incompatibility is greatly generated, and that the difficulty in singing may not be given to the user by changing the key (sound scale) which has been set suitable for the user.

As described above, according to the first embodiment, the tonality related to the characteristic of the music program can be easily changed, and one music program can be performed as if it were another song, and the playing function for fun as the music accompaniment playing system, can be increased.

In the above first embodiment, although the C major is changed to the C minor in the tonality change, the present invention can be adapted to any tonality of the key based on any root sound in the sound scale, and the reverse tonality change from the minor key to the major key is also possible by preparing the tonality change map of another kind in the ROM 10.

Further, by storing the tonality change map in the ROM 10 as the change table between the western sound scale and the extraordinary sound scale, such as the Japanese "youonkai" (positive sound scale), Arabic sound scale etc., the ordinary music program accustomed to listening, can be modified to be performed as the racial music, which has a completely different atmosphere from the original music program.

Furthermore, the tonality changing function of the first embodiment, can be used together with the key control function or the arranging function which is described later in the second embodiment by successively performing those processes.

In the above explanations, although the tonality change map is stored in the ROM, it may be stored to another type of memory device such as an OMDD. The temporary file is not an indispensable constitutional element, and the tonality changing process may be performed while supplying the data one after another in a real time manner to the digital sound source. The temporary file may not be stored in the RAM but may be stored in another type of memory device such as an OMDD.

Second Embodiment

The second embodiment of the present invention will be explained with referring to FIG. 5 to FIG. 7. The present embodiment is constructed to perform the melody changing (arranging) process of chord (harmony), rhythm and style etc., which are greatly related to the characteristic of the music program, in place of the tonality changing process of the first embodiment.

The construction of the second embodiment is the same as that of the first embodiment, except that the tonality change map and the temporary file are not used, but the real time processing is performed instead. The basic operation as for the music accompaniment playing performance is also the same as that of the first embodiment.

Figure 5:
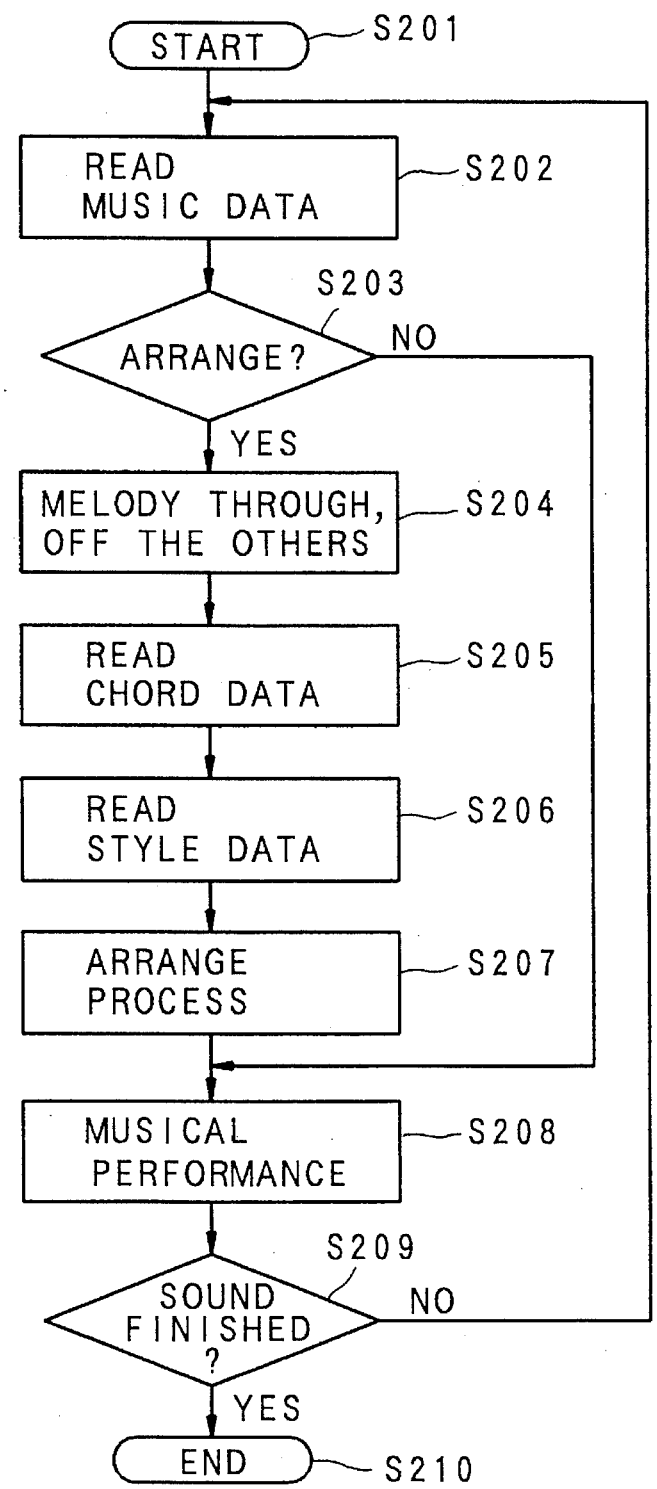
FIG. 5 is a flowchart of an arranging operation of a second embodiment.

Nextly, the operation of the arranging function in the second embodiment is explained with referring to a flowchart of FIG. 5.

In FIG. 5, the operation is started when the user requests the music title by use of the operation unit 23 (step S201). The controller 8 reads the note file related to the requested music title from the OMDD 5, and stores it to the RAM 9 (step S202).

Then, it is judged whether the arranging function specified upon requesting, is valid or not (step S203).

If it is not valid (NO at the step S203), since it is not necessary to change the note data, the performance of the music program is directly performed form the stored note file (step S208).

If it is valid (YES at the step S203), the melody changing operation to arrange is started.

Firstly, only data of the tracks related to the melody in the note file are directly transmitted to the MIDI sound source module 6, and data of the other tracks are not transmitted (step S204). The tracks related to the melody corresponds to the note tracks of the data areas NF8 and NF9 in FIG. 11B.

Nextly, the chord data of the chord track in the data area NF 15 in FIG. 11B, are read (step S205), and successively, the style data which are included in the program change track of the data area NF17, are read (step S206).

The MIDI data changing process for the arrangement, is performed on the basis of the read data (step S207).

After that, the performance is performed according to the data (step S208), and it is judged whether the music program is completely finished or not (step S209).

If it is finished (YES at the step S209), the operation is ended (step S210).

If it is not finished (NO at the step S209), the next data are read to continue the arranging operation and the performance.

Figure 6:
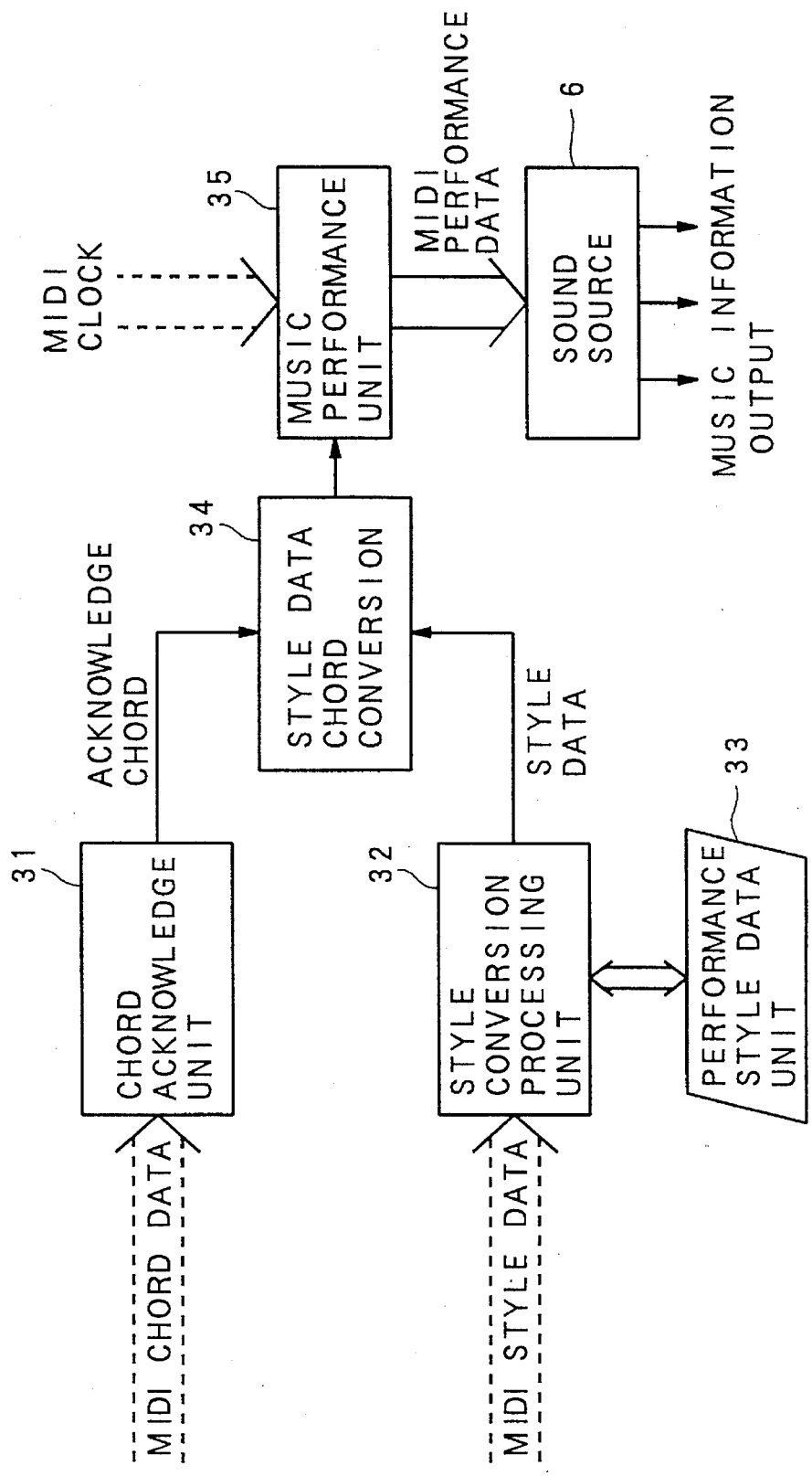
FIG. 6 is a block diagram for explaining the data flow in the second embodiment.

The data changing process which is performed between the controller 8 and the RAM 9 is explained with referring to FIG. 6.

The style of the style data in the program change track, which has been read at the step S206 (FIG. 5), is recognized by the style change processing unit 32. An arrangement style suitable for the original music program is set as this style. The style change processing unit 32 changes the performance style according to this recognized style by various data such as the performance style (e.g. rock, "enka", ballad, latin), and the performance pattern (e.g. introduction part, ordinary performance, fill-in (interlude)), included in the style data, and stores it to the temporary file of the RAM 9. The information to be processed by the style change processing unit 32 are the chord (harmony) progress, the rhythm pattern, the introduction portion giving a flavor to the music program, the harmony sound such as interlude, rhythm information and so on, which are suitable for the music genre of each music program.

On the other hand, as for the chord track read at the step S205 (FIG. 5), the chord (harmony sound) at the moment is recognized by the chord acknowledging unit 31.

Nextly, the style data chord conversion is performed by use of this recognized key and the processed style data by a style data chord conversion unit 34. The style data incudes the basic chord progress and the rhythm pattern of the music program. If the change (transposition) of the chord progress is not performed in harmony with the key of the original music program to be performed, it is not possible to perform along with the part of the melody transmitted without any processing. Therefore, in the present embodiment, the transposition operation to match the style data with the chord of the original music program is performed, at the chord conversion unit 34.

In this manner, the music performance unit 35 which is the MIDI sound source controlling unit, supplies the thus obtained data one after another as the MIDI data to the MIDI sound source module 6 on the basis of the MIDI clock supplied thereto. Finally, the performance of the arranged music program can be done.

The difference between the ordinary performance and the performance after the arranging process, is explained with referring to FIG. 7.

Figure 7A:
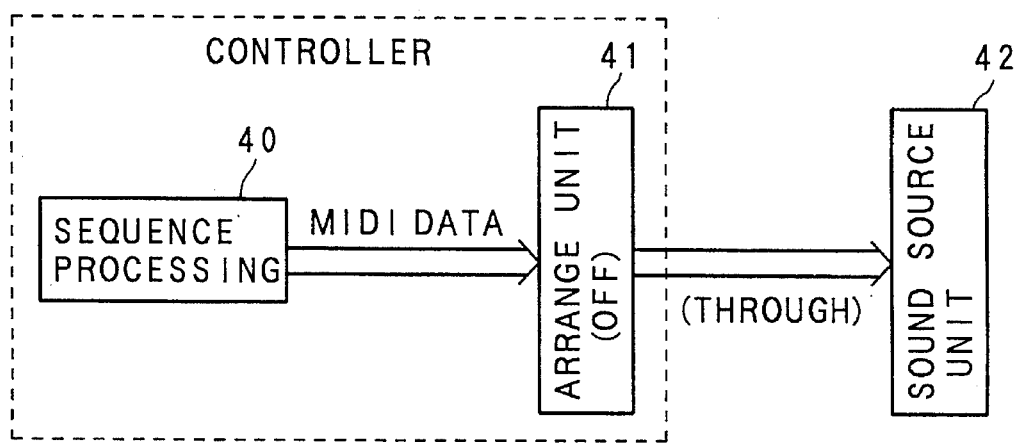
FIGS. 7A and 7B are diagrams for explaining data selection in the second embodiment.

FIG. 7A shows the condition in the ordinary performance. A sequence processing unit 40 performs a process to transmit the MIDI data one after another in the same manner as the process for the ordinary MIDI information. In FIG. 7A, an arrange unit 41 is a processing unit to perform the arranging process explained above with FIG. 6. At this time, since the arrange unit 41 is in an OFF condition i.e. performs nothing, the MIDI data is transmitted to a sound source unit 42 as it is, and the performance according to the original data is performed.

Figure 7B:
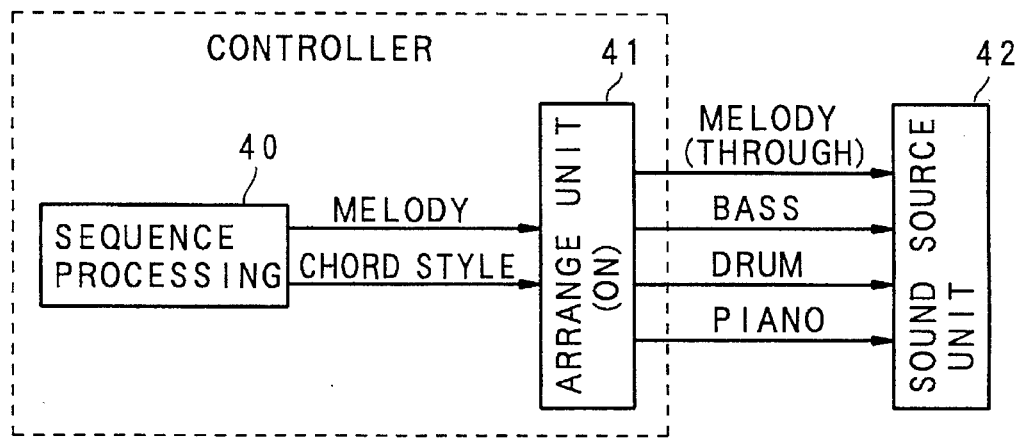

On the other hand, as shown in FIG. 7B, in case of the arranged-performance (melody changed-performance), a sequence processing unit 40 transmits the melody data, the chord data and the style data as aforementioned. The arrangement of the music program is performed by the arrange unit 41 in accordance with the aforementioned procedure. The data of instruments such as the bass, the drum, the piano etc., as the arranged MIDI data, are supplied to the sound source 42 together with the melody data, to give a performance.

As described above, according to the second embodiment, it is possible to easily change the melody in a real time reacting manner, and perform the music program with a different impression, so that the funny play as the performance system can be done.

In the second embodiment, although data are processed one after another in a time sequence, it is also possible to give a performance after changing and storing all of the data in advance in the temporary file. Further, by continuing the processes, the key controlling function and the tonality changing function in the first embodiment may be simultaneously performed with the function of the second embodiment.

In the above described embodiments, although the reproducing device by means of the MIDI information etc., which is stored in the exclusive MIDI information memory device (OMDD), the present invention can be applied to any type of the reproducing device as long as it can store the digital sound source controlling information based on the MIDI standard, and it can store the sound source controlling information at the sub code (for example, a compact disc digital audio etc.).

As described above in detail, according to the present embodiments, the music program can be arranged quite easily and the atmosphere of the music program can be greatly changed, by use of only one digital sound source controlling information. Namely, the melody can be changed by changing the major key to the minor key, or the other way around, such that the image or impression of the music program is changed from the popular to the racial or local song. Further, since the melody controlling information is the data which volume is relatively small, and yet which includes the characteristic pattern, it becomes possible to perform one music program by various melodies with using only a small area for the memory information, so that the additional value of the performance system by means of the digital sound source control, can be upgraded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A music accompaniment playing system comprising:

a first reproducing means for reproducing first digital sound source controlling information, melody controlling information related to the first digital sound source controlling information, and lyrics information corresponding to the first digital sound source controlling information, which are based on the MIDI (Musical Instrument Digital Interface) standard;

a memory for storing melody changing information, said melody changing information comprising a tonality changing map;

a melody changing means for reading the tonality changing map from said memory according to the melody controlling information reproduced by said first reproducing means, and changing a tonality expressed by the first digital sound source controlling information on the basis of tonality changing map to generate second digital sound source controlling information;

a digital sound source comprising a MIDI sound source module for generating music information signal from the second digital sound source controlling information;

a second reproducing means for reproducing video information; and a superimposing means for superimposing the lyrics information reproduced by said first reproducing means on the video information reproduced by said second reproducing means in synchronization with the music information signal generated by the digital sound source.

2. A system according to claim 1, wherein said melody changing information further comprises at least one of chord changing information, rhythm changing information and style changing information, and said melody changing means further reads said at least one chord changing information, rhythm changing information and style changing information, according to the melody controlling information reproduced by said first reproducing means and further changes one of chord, rhythm and style expressed by said first digital sound source controlling information on the basis of said melody changing information.

3. A system according to claim 1, wherein said first reproducing means comprises an OMDD (Optical Memory Disc Drive).

4. A system according to claim 1, wherein said memory comprises a ROM (Read Only Memory).

5. A system according to claim 1, further comprising a RAM (Random Access Memory) for temporarily storing the first digital sound source controlling information, the melody controlling information and said lyrics information reproduced by said first reproducing means, said melody changing means changing the first digital sound source controlling information stored in the RAM.

6. A system according to claim 1, wherein said melody changing means changes a display timing of the lyrics information on the basis of the melody changing information.

7. A system according to claim 1, wherein said first reproducing means reproduces digital sound information, and said system further comprises:

a D/A (Digital to Analog) convertor for converting the digital sound information to analog sound information signal; and a mixer for mixing the analog sound information signal with the music information signal generated from said digital sound source.

8. The system according to claim 1, further comprising an operation unit for specifying a music title of music to be played, wherein:

said first reproducing means reproduces the first digital sound source controlling information, the melody controlling information and the lyrics information corresponding to the specified music title; and said melody changing means identifies the tonality expressed by the reproduced first digital sound source controlling information, and changes the identified tonality with reference to the tonality changing table.

9. The system according to claim 8, wherein said melody changing means identifies the tonality for each portion of a measure number of the music to be played, and changes the tonality for said each portion.

10. The system according to claim 1, wherein:

said melody changing means judges whether a portion of the reproduced first digital sound source controlling information on each track is accompanied with a key change; and said melody changing means changes the tonality at one portion of the reproduced first digital sound source controlling information on a track which has been judged to be accompanied with the key change, and does not change the tonality at another portion of the reproduced first digital sound source controlling information on another track which has not been judged to be accompanied with the key change.

11. The system according to claim 1, wherein said melody changing means changes the tonality on the basis of the tonality changing table without changing a root sound.

12. A music accompaniment playing method comprising the steps of:

reproducing, by a first reproducing means, first digital sound source controlling information, melody controlling information related to the first digital sound source controlling information, and lyrics information corresponding to the first digital sound source controlling information, which are based on the MIDI (Musical Instrument Digital Interface) standard;

storing melody changing information in a memory, said melody changing information comprising a tonality changing map;

reading the tonality changing map from said memory according to the melody controlling information reproduced by said first reproducing means;

changing a tonality expressed by the first digital sound source controlling information on the basis of the tonality changing map to generate second digital sound source controlling information;

generating music information signal from the second digital sound source controlling information by a digital sound source comprising a MIDI sound source module;

reproducing video information by a second reproducing means; and superimposing the lyrics information reproduced by said first reproducing means on the video information reproduced by said second reproducing means in synchronization with the music information signal generated by the digital sound source.

13. A method according to claim 12, wherein said melody changing information further comprises at least one of chord changing information, rhythm changing information and style changing information, and wherein said method further comprising the steps of:

reading said at least one of chord changing information, rhythm changing information and style changing information, according to the melody controlling information reproduced by said first reproducing means; and changing one of chord, rhythm and style expressed by said first digital sound source controlling information on the basis of the melody changing information.

14. A method according to claim 12, further comprising the step of specifying a music title of music to be played, wherein:

said first reproducing step comprises the step of reproducing the first digital sound source controlling information, the melody controlling information and the lyrics information corresponding to the specified music title; and said melody changing step comprises the steps of identifying the tonality expressed by the reproduced first digital sound source controlling information, and changing the identified tonality with reference to the tonality changing table.

* * * * *